Patented Dec. 30, 1941

2,268,129

UNITED STATES PATENT OFFICE 2,268,129

PROCESS FOR MAKING AMINES OF THE ACETYLENE SERIES

Walter Reppe and Hellmut Scholz, Ludwigshafen-on-the-Rhine, Germany, assignors, by mesne assignments, to General Aniline & Film Corporation, New York, N. Y., a corporation of Delaware No Drawing. Application November 17, 1938, Serial No. 241,022. In Germany November 27, 1937

7 Claims. (Cl. 260—583)

The object of this invention is a process for making unsaturated amines of the acetylene series.

We have found that organic unsaturated amino compounds containing acetylene linkages are obtained by treating with acetylene in the liquid phase ammonia or organic basic derivatives of ammonia wherein the nitrogen atom is connected with at least one hydrogen atom and is attached to non-aromatic carbon atoms, in other words to aliphatic, araliphatic, cycloaliphatic or heterocyclic carbon atoms in the presence of heavy metals of the 1st and 2nd groups of the periodic system or their compounds.

Among suitable derivatives of ammonia of the said kind there may be mentioned for example primary and secondary aliphatic, araliphatic or cycloaliphatic amines and secondary heterocyclic bases, as for example methylamine, ethylamine, ethanolamine, butylamine and decylamine, dimethylamine and dibutylamine, aliphatic diamines, such as ethylene diamine, benzylamine, cyclohexylamine and piperidine or tetrahydroquinoline.

Suitable catalysts are in particular copper, silver and mercury in finely divided form, and also salts of these metals, as for example cupric chloride, cuprous chloride, copper acetate, copper formate. These catalysts are converted into acetylene compounds under the influence of the acetylene in the course of the reaction, and we have found that it is essential to carry out the reaction under conditions under which acetylene compounds are formed. Instead of the beforementioned metals and metal salts there may also be used as catalysts acetylene compounds of these metals which have been prepared outside the reaction mixture. It is preferable to work with the aid of copper acetylide because other acetylene compounds, e. g. those of silver and mercury are liable to decompose under explosion. However, it is understood that our invention is not restricted to the use of copper acetylide as the catalytic material, acetylene compounds of other heavy metals of the first and second group of the periodic system being also suitable. Mixtures of acetylene compounds, such as obtained by introducing acetylene into a mixture of copper and silver salt solutions may also be used.

The reaction may be carried out in the presence or absence of solvents or diluents, such as hydrocarbons, e. g. benzene, toluene, decahydronaphthalene, and oxygen-containing solvents which are inert under the reaction conditions, e. g. ethylacetate. The reaction proceeds at ordinary temperature, but higher temperatures, as for example of from 50 to 120° C. or more, may be used. Working may be effected at atmospheric or increased pressure, e. g. at pressures from 5 to 30 atmospheres and continuously or discontinuously. Inert diluent gases, such as nitrogen may also be used. Care should be taken that the reaction mixture does not exert an acid reaction so that acetylene can combine with the free basic nitrogen compound.

The reaction products obtained constitute butine compounds, in other words amino compounds containing an aliphatic radicle containing four carbon atoms and one acetylene linkage. They are suitable as intermediate denaturing agents and as agents for combating pests.

The following examples will further illustrate how this invention may be carried out in practice but the invention is not restricted to these examples. The parts are by weight.

*Example 1*

A mixture of 60 parts of tetrahydronaphthalene, 28 parts of dimethylamine and 2 parts of cuprous chloride is treated in a pressure-tight vessel at from 50 to 60° C. with a mixture of acetylene and nitrogen (2:1) under a pressure of from 10 to 20 atmospheres while stirring until acetylene is no longer absorbed. This is the case after about 24 hours. The acetylene used up is replaced by pressing in fresh acetylene from time to time.

After allowing the dissolved acetylene to escape and distilling off the unchanged dimethylamine, there is obtained from the reaction mixture a triple-unsaturated, basic nitrogenous compound having a boiling point of 96° C. in a good yield. By hydrogenation this is converted into 2-dimethylaminobutane.

*Example 2*

100 parts of diethylamine and 5 parts of cuprous chloride are heated to from 100 to 110° C. in a pressure-tight vessel while stirring and treated with a mixture of nitrogen and acetylene (1:2) until saturation is reached. After cooling, the cuprous acetylide formed in the course of the reaction is filtered off by suction and the filtrate fractionally distilled. At from 127 to 128° C. there is obtained a good yield of triple-unsaturated nitrogen base having a melting point of 10° C. which is converted by hydrogenation into 2-diethylaminobutane. The cuprous acetylide may be used repeatedly.

Example 3

40 parts of cuprous chloride are added as a catalyst to a solution of 400 parts of diethylamine in 400 parts of ethyl acetate, and the whole treated in a pressure-tight vessel at from 100 to 110° C. with acetylene which is diluted with nitrogen in the ratio 1:1. When the absorption of acetylene has ceased, the reaction solution is freed from catalyst by filtration by suction and fractionally distilled. 484 parts of a triple-unsaturated base smelling like terpenes and having a boiling point of from 127 to 128° C. are obtained.

The same result is obtained when using copper acetate instead of cuprous chloride.

Example 4

A mixture of 400 parts of diethylamine, 400 parts of decahydronaphthalene and 40 parts of cuprous chloride is heated to from 100 to 110° C. in a pressure-tight vessel under nitrogen. The pressure of 10 atmospheres thus set up is raised to 20 atmospheres by pressing in acetylene. Acetylene is subsequently pressed in during the reaction. After cooling, the compound of copper and acetylene formed is separated from the reaction mixture and the solution subjected to fractional distillation. The same base as in Examples 2 and 3 is thus obtained in a yield of 65 per cent.

Example 5

50 parts of mono-normal-butylamine, to which 10 per cent of cuprous chloride have been added as catalyst, are treated with a mixture of acetylene and nitrogen for 48 hours at from 100 to 110° C. under a pressure of from 18 to 20 atmospheres. The pasty reaction product thus obtained is diluted with ether and separated from the catalyst. After boiling off the ether, a residue remains behind. By fractional distillation this yields a liquid boiling at from 147 to 149° C. having a penetrating odor and also substances of higher boiling point and resinous substances. The fraction passing over at from 147 to 149° C. contains a triple linkage and yields mono-normal-butylaminobutane by hydrogenation.

Example 6

53.5 parts of monobenzylamine and 5.35 parts of cuprous chloride are treated for 48 hours at from 100 to 110° C. with a mixture of acetylene and nitrogen under pressure, the acetylene used up being continuously replaced by pressing in fresh acetylene. The viscous reaction product is taken up in ether and freed from insoluble constituents by filtration by suction. After boiling off the ether, there is obtained by fractional distillation of the residue at a pressure of 1 millimetre (mercury gauge) a liquid triple-unsaturated base at a temperature of from 60 to 62° C. The base has the composition $C_{11}H_{13}N$. The molecular weight found was 155.

Example 7

A solution of 428 parts of monobenzylamine in the same amount of ethyl acetate is treated in a pressure-tight vessel at from 100 to 110° C. in the presence of 43 parts of cuprous chloride with a mixture of equal volumes of acetylene and nitrogen under a pressure of from 18 to 20 atmospheres. After the absorption of 150 parts of acetylene during the course of 47 hours, the reaction solution is cooled, freed from insoluble copper compounds by filtration by suction and fractionally distilled. In addition to the solvent, unchanged benzylamine and a brittle resin, there are thus obtained two compounds containing nitrogen, namely:

(1) 60 parts of an amine boiling at from 54 to 56° C. under a pressure of 0.5 millimetre (mercury gauge) and having, according to elementary analysis, the composition $C_{11}H_{13}N$. The molecular weight found was 154.

(2) 290 parts of benzylacetamide which boils at from 117 to 118° C. under a pressure of 0.3 millimetre (mercury gauge) and which melts at from 62 to 63° C.

Example 8

255 parts of piperidine, 510 parts of tetrahydronaphthalene and 25 parts of cuprous chloride are treated with acetylene diluted with nitrogen at a pressure of from 18 to 20 atmospheres and a temperature of from 100 to 110° C. 160 parts of acetylene are absorbed in the course of 40 hours. After separating the catalyst, the reaction solution is separated by distillation into a fraction practically free from tetrahydronaphthalene and a fraction rich in the same. The amine is dissolved from both with dilute hydrochloric acid. By adding caustic soda solution to the hydrochloric acid solution, the amine separates as a liquid. It boils at from 58 to 59° C. under a pressure of 12.5 millimetres (mercury gauge). It corresponds in its composition to the formula $C_9H_{15}N$ and has a molecular weight of 137.

Example 9.

297 parts of cyclohexylamine, with an addition of 594 parts of benzene and 30 parts of cuprous chloride, are caused to react with acetylene as described in Example 8. After an absorption of 120 parts of acetylene, which takes place in 59 hours, the reaction solution is freed from the acetylene-copper compound formed and fractionally distilled. After boiling off the benzene and the unconverted cyclohexylamine, there are obtained 220 parts of a triple-unsaturated amine boiling at from 58 to 60° C. under a pressure of 4.5 millimetres (mercury gauge) which readily crystallizes at room temperature. By recrystallization from petroleum ether, hard, compact needles are obtained which melt at 44° C. Its composition and molecular weight agree with the formula $C_{10}H_{17}N$. In addition to this compound, there are also obtained small amounts of a nitrogenous substance of higher boiling point and a brittle resin.

What we claim is:

1. A process of producing organic unsaturated amino compounds which comprises treating with acetylene in the liquid phase at temperatures from normal to 120° C. basic nitrogen compounds selected from the group consisting of ammonia and primary and secondary open-chain and cyclic aliphatic amines, aralkyl amines and saturated heterocyclic amines in the presence of a catalyst comprising essentially an acetylide of a heavy metal selected from the first and second group of the periodic system.

2. A process of producing organic unsaturated amino compounds which comprises treating with acetylene in the liquid phase at temperatures from normal to 120° C. basic nitrogen compounds selected from the group consisting of ammonia and primary and secondary open-chain and cyclic aliphatic amines, aralkyl amines and saturated heterocyclic amines in the presence of a salt of a heavy metal selected from the class consisting of the heavy metals of the first and second groups of the periodic system, which salts under the reaction conditions form the corresponding heavy metal acetylide.

3. A process of producing organic unsaturated amino compounds which comprises treating with acetylene in the liquid phase at temperatures from normal to 120° C. basic nitrogen compounds selected from the group consisting of ammonia and primary and secondary open-chain and cyclic aliphatic amines, aralkyl amines and saturated heterocyclic amines in the presence of copper acetylide.

4. A process of producing organic unsaturated amino compounds which comprises treating with acetylene in the liquid phase at temperatures from normal to 120° C. basic nitrogen compounds selected from the group consisting of ammonia and primary and secondary open-chain and cyclic aliphatic amines, aralkyl amines and saturated heterocyclic amines in the presence of a copper salt which under reaction conditions forms copper acetylide.

5. A process of producing organic unsaturated amino compounds which comprises treating with acetylene in the liquid phase at temperatures from normal to 120° C. an aliphatic saturated amine wherein the nitrogen atom is connected with at least one hydrogen atom in the presence of copper acetylide.

6. A process of producing organic unsaturated amino compounds which comprises treating with acetylene in the liquid phase at temperatures from normal to 120° C. a secondary saturated aliphatic amine in the presence of copper acetylide.

7. A process of producing organic unsaturated amino compounds which comprises treating with acetylene in the liquid phase at temperatures between normal and 120° C. diethylamine in the presence of copper acetylide.

WALTER REPPE.
HELLMUT SCHOLZ.